US010629959B2

(12) United States Patent
Dürr et al.

(10) Patent No.: US 10,629,959 B2
(45) Date of Patent: Apr. 21, 2020

(54) ELECTRODE UNIT FOR AN ELECTROCHEMICAL DEVICE

(71) Applicant: BASF SE, Ludwigshafen (DE)

(72) Inventors: Anna Katharina Dürr, Ludwigshafen (DE); Jesus Enrique Zerpa Unda, Viernheim (DE); Günther Achhammer, Mannheim (DE); Domnik Bayer, Heidelberg (DE); Peter Heidebrecht, Speyer (DE); Stefan Meuer, Worms (DE)

(73) Assignee: BASF SE (DE)

( * ) Notice: Subject to any disclaimer, the term of this patent is extended or adjusted under 35 U.S.C. 154(b) by 103 days.

(21) Appl. No.: 15/116,531

(22) PCT Filed: Jan. 28, 2015

(86) PCT No.: PCT/EP2015/051667
§ 371 (c)(1),
(2) Date: Aug. 4, 2016

(87) PCT Pub. No.: WO2015/117870
PCT Pub. Date: Aug. 13, 2015

(65) Prior Publication Data
US 2016/0351970 A1 Dec. 1, 2016

(30) Foreign Application Priority Data
Feb. 7, 2014 (EP) .................................. 14154255

(51) Int. Cl.
*H01M 10/39* (2006.01)
*H01M 2/16* (2006.01)
(Continued)

(52) U.S. Cl.
CPC ..... *H01M 10/3918* (2013.01); *H01M 2/1673* (2013.01); *H01M 4/5805* (2013.01);
(Continued)

(58) Field of Classification Search
None
See application file for complete search history.

(56) References Cited

U.S. PATENT DOCUMENTS

| 4,049,884 A | 9/1977 | Desplanches et al. |
| 4,084,041 A | 4/1978 | Ludwig |

(Continued)

FOREIGN PATENT DOCUMENTS

| EP | 0421159 A1 | 4/1991 |
| EP | 1 672 098 A2 | 6/2006 |

(Continued)

OTHER PUBLICATIONS

International Preliminary Report on Patentability for PCT/EP2015/051667 dated Aug. 9, 2016 with English Translation Attached.

(Continued)

*Primary Examiner* — Wojciech Haske
(74) *Attorney, Agent, or Firm* — Faegre Drinker Biddle & Reath LLP

(57) ABSTRACT

An electrode unit for an electrochemical device, comprising (i) a solid electrolyte which divides a space for molten cathode material, selected from the group consisting of elemental sulfur and polysulfide of the alkali metal anode material, and a space for molten alkali metal anode material, and (ii) a porous solid state electrode directly adjacent to the solid electrolyte within the space for the cathode material, with a non-electron-conducting intermediate layer S present between the solid state electrode and the solid electrolyte, wherein this intermediate layer S has a thickness in the range from 0.5 to 5 mm and, before the first charge of the electrochemical device, has been impregnated fully with a polysulfide composition, comprising (A) pure polysulfides $Met_2S_x$ with Met=alkali metal of the alkali metal anode material selected from lithium, sodium, potassium, and x is dependent on the alkali metal and is 2, 3, 4 or 5 for Na and (Continued)

is 2, 3, 4, 5, 6, 7, 8 for Li and is 2, 3, 4, 5, 6 for K, or (B) mixtures of the polysulfides of one and the same alkali metal from (A) with one another.

7 Claims, 1 Drawing Sheet

(51) Int. Cl.
    *H01M 4/58*     (2010.01)
    *H01M 10/44*     (2006.01)
    *H01M 4/02*     (2006.01)

(52) U.S. Cl.
    CPC ....... *H01M 10/39* (2013.01); *H01M 10/3909* (2013.01); *H01M 10/399* (2013.01); *H01M 10/3927* (2013.01); *H01M 10/446* (2013.01); *H01M 2004/021* (2013.01)

(56) References Cited

U.S. PATENT DOCUMENTS

| | | | |
|---|---|---|---|
| 4,968,568 A * | 11/1990 | Higley | H01M 2/1613 429/102 |
| 8,658,317 B2 | 2/2014 | Weppner et al. | |
| 2003/0108788 A1 * | 6/2003 | Miyoshi | H01M 2/14 429/104 |
| 2007/0148553 A1 | 6/2007 | Weppner | |

FOREIGN PATENT DOCUMENTS

| | | |
|---|---|---|
| GB | 1347990 A | 2/1974 |
| JP | S5910539 B2 | 3/1984 |
| JP | H01221869 A | 9/1989 |
| JP | H03179677 A | 8/1991 |
| JP | H0479169 A | 3/1992 |
| JP | H0668905 A | 3/1994 |
| JP | H0794210 A | 4/1995 |
| JP | H0896844 A | 4/1996 |
| JP | H10270073 A | 10/1998 |
| JP | H11329484 A | 11/1999 |
| JP | 2002/008712 A | 1/2002 |
| JP | 2005071774 A | 3/2005 |
| JP | 2005/122948 A | 5/2005 |
| JP | 2005/197139 A | 7/2005 |
| WO | WO-2005/085138 A1 | 9/2005 |
| WO | WO-2009/003695 A2 | 1/2009 |
| WO | WO-2012/110219 A1 | 8/2012 |

OTHER PUBLICATIONS

International Search Report for PCT/EP2015/051667 dated May 6, 2015.
Sudworth, J. L., "The Sulfur Electrode", Chapter 5 in "The Sodium Sulfur Battery", Sudworth, J. L., et al., Eds., Chapman and Hall Ltd., 1985, pp. 141-197.
Sudworth, J. L., "Practical Sulfur Electrodes", Sections 5.3.1 and 5.3.2 in "The Sodium Sulfur Battery", Sudworth, J. L., et al., Eds., Chapman and Hall Ltd., 1985, pp. 159-164.
EP Patent Application No. 15703513.0, dated Mar. 25, 2019.
Japan Office Action for Japanese Application No. 2016-550589, dated Feb. 25, 2019.

* cited by examiner

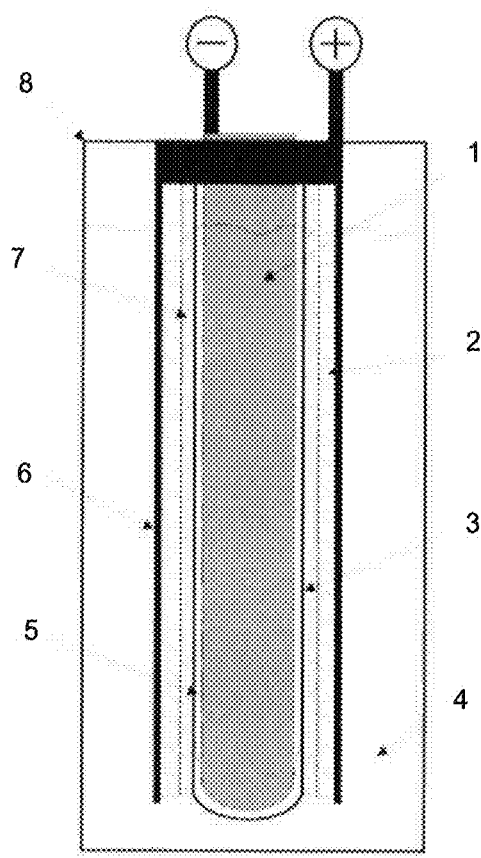

ELECTRODE UNIT FOR AN ELECTROCHEMICAL DEVICE

RELATED APPLICATIONS

This application is a national stage application (under 35 U.S.C. § 371) of PCT/EP2015/051667, filed Jan. 28, 2015, which claims benefit of European Application 14154255.5, filed Feb. 7, 2014.

The invention relates to an electrode unit for an electrochemical device, comprising (i) a solid electrolyte which divides a space for molten cathode material, selected from the group consisting of elemental sulfur and polysulfide of the alkali metal anode material, and a space for molten alkali metal anode material and (ii) a porous solid state electrode directly adjacent to the solid electrolyte within the space for the cathode material, with a non-electron-conducting intermediate layer S present between the solid state electrode and the solid electrolyte, wherein the intermediate layer S has a thickness in the range from 0.5 to 5 mm and, before the first charge of the electrochemical device, has been impregnated fully with a polysulfide composition, comprising (A) pure polysulfides $Met_2S_x$ with Met=alkali metal of the alkali metal anode material selected from lithium, sodium, potassium, and x is dependent on the alkali metal and is 2, 3, 4 or 5 for Na and is 2, 3, 4, 5, 6, 7, 8 for Li and is 2, 3, 4, 5, 6 for K, or (B) mixtures of the polysulfides of one and the same alkali metal from (A) with one another, to an electrochemical device comprising the electrode unit as defined in the claims, to a process for producing a non-electron-conducting intermediate layer S in an electrode unit as defined in the claims, which comprises subjecting the porous starting material that forms the non-electron-conducting intermediate layer S to a pressure of less than 1 atm and impregnating it with the molten polysulfide composition of the alkali metal that forms the alkali metal anode material comprising (A) pure polysulfides $Met_2S_x$ with Met=alkali metal of the alkali metal anode material selected from lithium, sodium, potassium, and x is dependent on the alkali metal and is 2, 3, 4 or 5 for Na and is 2, 3, 4, 5, 6, 7, 8 for Li and is 2, 3, 4, 5, 6 for K, or (B) mixtures of the polysulfides of one and the same alkali metal from (A) with one another, to a process for first charging of an electrochemical device as defined in the claims, which comprises initially charging the space for the molten cathode material with a polysulfide compound (I) as a melt, comprising: (A) pure polysulfides $Met_2S_x$ with Met=alkali metal of the desired alkali metal anode material, selected from lithium, sodium, potassium, x is dependent on the alkali metal and is 2, 3, 4 or 5 for Na and is 2, 3, 4, 5, 6, 7, 8 for Li and is 2, 3, 4, 5, 6 for K, or (B) mixtures of the polysulfides of one and the same alkali metal from (A) with one another and/or in each case with elemental sulfur or (C) mixtures of the particular alkali metal sulfide $Met_2S$ with elemental sulfur and/or the polysulfides $Met_2S$, mentioned in (A) or (B), and additionally installing, in the space for the molten anode material, an electron-conducting device in such a way that it touches the surface of the solid electrolyte facing the anode material at least in the lower region, connects cathode space and anode space to an electrical circuit and sends an electrical current through this electrochemical device, such that the polysulfide compound (I) is cleaved electrolytically, forming elemental sulfur in the cathode space and metallic alkali metal in the anode space, and to the use of a non-electron-conducting intermediate layer S in an electrode unit for an electrochemical device, comprising (i) a solid electrolyte which divides a space for molten cathode material—as defined herein—and a space for molten alkali metal anode material—as defined herein—and (ii) a porous solid state electrode which is separated from the solid electrolyte by a non-electron-conducting intermediate layer S, wherein the non-electron-conducting intermediate layer S has a thickness in the range from 0.5 to 5 mm and, before the first charge of the electrochemical device, has been impregnated fully with a polysulfide composition of the alkali metal that forms the alkali metal anode material, comprising (A) pure polysulfides $Met_2S_x$ with Met=alkali metal of the alkali metal anode material selected from lithium, sodium, potassium, and x is dependent on the alkali metal and is 2, 3, 4 or 5 for Na and is 2, 3, 4, 5, 6, 7, 8 for Li and is 2, 3, 4, 5, 6 for K, or (B) mixtures of the polysulfides of one and the same alkali metal from (A) with one another.

Electrochemical devices having a space for molten cathode material, a space for molten anode material, a solid electrolyte that divides the spaces, and a porous electrode present within the cathode space are known and are also referred to hereinafter as "electrochemical device(s) having solid electrolyte".

One example of such an electrochemical device having solid electrolyte is what is called the sodium-sulfur battery, described, for example, in Ullmann's Encyclopedia of Industrial Chemistry, vol. 4, D. Berndt, D. Spahrbier, chapter 7.2.2.2., pages 608 to 609, Wiley-VCH (2003).

In the sodium-sulfur battery, sulfur is the cathode material, sodium the anode material and β-alumina the solid electrolyte, and a graphite felt is the electrode which is in contact with the sulfur in the cathode space.

The cathode space in the context of the present invention is the space in the electrochemical device having solid electrolyte in which polysulfide is oxidized to elemental sulfur in the course of charging of this cell, and elemental sulfur is reduced to polysulfide in the course of discharging of this cell.

The anode space in the context of the present invention is the space in the electrochemical device with solid electrolyte in which alkali metal ions, for example lithium ions, sodium ions or potassium ions, are reduced to the elemental alkali metal, for example lithium, sodium or potassium, in the course of charging of this device, and elemental alkali metal, for example lithium, sodium or potassium, is oxidized to alkali metal ions, for example lithium ions, sodium ions or potassium ions, in the course of discharge, The electrochemical devices with solid electrolyte can be used as rechargeable batteries for electrical energy, also referred to scientifically in general form as "accumulators" or "secondary cells". These accumulators generate electrical current through a redox reaction and are thus galvanic elements.

If, on the other hand, electrical current is sent through the electrochemical device with solid electrolyte, this device can also be used for electrolysis, i.e. breakdown of a chemical compound—for example into its elemental constituents. In that case, this is typically referred to scientifically in general form as an electrolysis cell. It is still desirable for technical purposes to develop an electrochemical device for storing electrical power on a large scale and releasing it to a power grid if required. For example, it is desirable to store the electrical energy produced by wind power plants in order to release it into the power grid to the consumer at times of deficiency.

For this purpose, large storage capacities are required, which could be provided, for example, by sodium-sulfur batteries.

One problem with sodium-sulfur batteries is that, as the battery is charged, sulfur, which is an electrical insulator, is deposited on the cathode side of the solid electrolyte surface, the result of which is generally that this sulfur layer blocks the migration of the sodium ions to the surface of the solid electrolyte in the course of battery charging, which in turn leads to an increase in the electrical resistance of the cell, to premature polarization of the electrode and to incomplete charging of the cell, i.e. loss of battery capacity.

A further problem with the sodium-sulfur battery is that, in the event of fracture of or damage to the solid electrolyte, especially in the charged state of the battery, liquid sodium comes into direct contact with liquid sulfur—typically at high temperature, for example 300 to 400° C.—and—especially directly at the site of fracture of or damage to the solid electrolyte—a strong exothermic reaction takes place, which leads, for example, to abrupt vaporization of the sulfur with rapid pressure buildup in the cell, damaging or destroying it, and releasing the contents thereof, which can react vigorously with the surrounding atmosphere and hence ultimately damage or destroy other cells or even the entire battery.

GB 1,347,990 A describes a rechargeable electrochemical generator of the sodium-sulfur type with molten sulfur as cathode material, molten sodium as anode material, a β-alumina solid electrolyte ("sodium beta alumina") and a graphite felt electrode which is in contact with the sulfur melt (cathode material), wherein the graphite felt electrode is separated from the solid electrolyte by a porous layer, having a thickness of a few micrometers, of an electrically insulating material, for example α-alumina.

GB 1,347,990 A does not disclose that the electrically insulating material is impregnated with alkali metal polysulfide, preferably before the first charge of the generator.

U.S. Pat. No. 4,084,041 describes a sodium-sulfur battery having molten sulfur and/or molten polysulfide (cathode space), molten sodium (anode space), β-alumina solid electrolyte ("beta-alumina") and a graphite felt electrode which is in contact with the molten sulfur and the solid electrolyte, wherein some of the electrodes are coated with electrically insulating alumina, such that a particular maximum ohmic resistance is attained, without the electrode filling the entire volume of the cathode space. U.S. Pat. No. 4,084,041 does not disclose that the graphite felt electrode partly coated with electrically insulating alumina is impregnated with alkali metal polysulfide, preferably before the first charge of the battery.

J. L. Sudworth, A. R. Tilley mention, in "The Sodium Sulfur Battery", Chapman and Hall Ltd., 1985 (ISBN 0412 164906), page 189, lines 1 to 3, in the chapter "The sulfur electrode", that a layer of α-alumina fibers of thickness 1 mm ("ICI Ltd. Saffil low density mat") can be arranged between the carbon felt and the solid electrolyte of a flat plate cell. Sudworth and Tilley do not disclose that the α-alumina layer has been fully impregnated with alkali metal polysulfide.

It was an object of the present invention to provide an electrochemical device having solid electrolyte that does not have the disadvantages of the prior art, and that—especially prior to the first charge of the cell—releases less heat in the event of damage to or fracture of the solid electrolyte and hence gives greater safety in the electrochemical cell and ultimately in the entire battery, still with a good internal resistance of the cell.

The object is achieved by the electrode unit as claimed and described herein, also referred to hereinafter as "inventive electrode unit", by the electrochemical device as claimed and described herein, also referred to hereinafter as "inventive electrochemical device", by the process for producing a non-electron-conducting intermediate layer S, as claimed and described herein, by the process for first charging of an electrochemical device, as claimed and described herein, and by the use of a non-electron-conducting intermediate layer S in an electrode unit as claimed and described herein.

The inventive electrode unit is within the space for molten cathode material in an electrochemical device, which comprises a space for molten cathode material, selected from the group consisting of elemental sulfur and polysulfide of the alkali metal anode material—this polysulfide preferably as defined hereinafter—and a space for molten alkali metal anode material—the latter preferably as defined hereinafter—which are separated from one another by a solid electrolyte, wherein the electrode unit comprises a porous solid state electrode directly adjacent to the solid electrolyte and a non-electron-conducting intermediate layer S between the solid state electrode and the solid electrolyte, and this intermediate layer S, before the first charge of the electrochemical device, has been impregnated fully with a polysulfide composition of the alkali metal that forms the alkali metal anode material, comprising (A) pure polysulfides $Met_2S_x$ with Met=alkali metal of the alkali metal anode material selected from lithium, sodium, potassium, especially sodium, and x is dependent on the alkali metal and is 2, 3, 4 or 5, preferably 3, 4 or 5, especially 4, for Na and is 2, 3, 4, 5, 6, 7, 8, preferably 3, 4, 5, 6, 7 or 8, for Li and is 2, 3, 4, 5, 6, preferably 3, 4 or 5, especially 5, for K, or (B) mixtures of the polysulfides of one and the same alkali metal from (A) with one another. This polysulfide composition is also referred to hereinafter as "inventive polysulfide composition".

In this context, "fully" means that virtually exclusively the inventive polysulfide composition is present in the entire open porosity of the starting material that forms the non-electron-conducting intermediate layer S. The open porosity is determined as follows: the bulk density of the starting material that forms the intermediate layer S is determined in a customary manner—for example by determining the weight and the volume. The intrinsic density of the starting material that forms the intermediate layer S is determined in a customary manner or found in the literature, and the open porosity is calculated as follows: 1—bulk density of the specimen of said starting material/intrinsic density of said starting material that forms the specimen. In illustrative terms, the open porosity is, for example, the intermediate space between the fibers of the starting material that forms the intermediate layer S. The starting material that forms the non-electron-conducting intermediate layer S is described in detail herein.

The cathode material used is typically a material that can react chemically with the anode material; typically, it is molten under the conditions of operation of the electrochemical device, The molten cathode material is selected from the group consisting of elemental sulfur and a polysulfide of the alkali metal anode material; in other words, the alkali metal that forms the alkali metal anode material. A preferred molten cathode material is elemental sulfur alone or elemental sulfur in combination with polysulfides of the alkali metal that forms the alkali metal anode material.

Useful polysulfides of alkali metal that forms the alkali metal anode material preferably include (A) pure polysulfides $Met_2S_x$ with Met=alkali metal of the alkali metal anode material, selected from lithium, sodium, potassium, especially sodium, and x is dependent on the alkali metal and is 2, 3, 4 or 5, preferably 3, 4 or 5, especially 4, for Na and is 2, 3, 4, 5, 6, 7, 8, preferably 3, 4, 5, 6, 7 or 8, for Li and is 2, 3, 4, 5, 6, preferably 3, 4 or 5, especially 5, for K, or (B) mixtures of the polysulfides of one and the same alkali metal from (A) with one another and/or in each case with elemental sulfur, (C) mixtures of the particular alkali metal sulfide $Met_2S$ with elemental sulfur and/or the polysulfides $Met_2S_x$ mentioned in (A) or (B).

The molten cathode material can be introduced into the inventive electrochemical device in molten form (molten solid) or in solid form, preferably in molten form, and is in the liquid molten state in the course of charging, discharging and operation thereof, typically at a temperature in the range from 300 to 400° C.

The alkali metal anode material is selected from the group consisting of lithium, sodium and potassium, preferably sodium, potassium, especially sodium.

In the context of the invention, the molten alkali metal anode material is typically formed by electrolysis of the cathode material, but can also be introduced into the inventive electrochemical device in solid form and is in the liquid molten state in the course of charging, discharging and operation thereof, typically at a temperature of 300 to 400° C.

The molten anode material, selected from the group consisting of lithium, sodium and potassium, preferably sodium, potassium, especially sodium, is typically stored in a vessel connected to the anode space and outside the actual electrochemical cell. In the discharged state of the electrochemical cell this reservoir vessel is generally virtually empty, and in the charged state of the electrochemical cell this reservoir vessel is generally virtually full.

The molten anode material is typically in electrical contact with an external circuit, typically via a suitable current collector device.

The solid electrolyte which divides the space for the molten cathode material from the space for the molten alkali metal anode material is typically a polycrystalline ceramic material having an ion conductivity for the alkali metal ions that correspond to the alkali metal anode material, preferably for lithium ions or sodium ions or potassium ions, more preferably for sodium ions or potassium ions, especially for sodium ions.

A polycrystalline ceramic material of good suitability comprises aluminum oxide units and alkali metal oxide units of that alkali metal whose ions are intended to be conducted, preferably lithium or sodium or potassium, more preferably sodium or potassium, especially sodium.

For an inventive electrochemical device having lithium as alkali metal anode material, examples of useful solid electrolyte materials include the following: lithium-doped perovskites, compounds of the LISICON type having the general formula $Li_{2+2x}Zn_{1-x}GeO_4$, Li-beta-alumina, lithium ion-conducting solid electrolytes having garnet structure, for example those as described in WO 2009/003695 A or WO 2005/085138 A.

For an inventive electrochemical device having potassium as alkali metal anode material, examples of useful materials include the following: a solid polycrystalline potassium ion conductor having a $\beta''-Al_2O_3$ structure, as described in EP 1 672 098 A2, including in [0013], [0016] to [0019] and the relevant examples, the disclosure of which is incorporated herein explicitly by reference.

For an inventive electrochemical device having sodium as alkali metal anode material, a preferred option is sodium-containing alumina.

Sodium-containing alumina, also called "sodium aluminate", is known. It is also referred to among specialists and in the literature as β-alumina or $\beta-Al_2O_3$; see, for example, Ullmann's Encyclopedia of Industrial Chemistry, 6th Edition, 2000 Electronic Release, Wiley, under "Aluminium Oxide" point 1.6. The molar ratio of $Na_2O:Al_2O_3$ in the sodium aluminate is typically in the range from 1:1 to 1:11.

The term "β-alumina" is used among specialists and in the literature especially for sodium aluminates having a hexagonal crystal structure ideally with the $P6_3$/mmc space group.

Sodium aluminate having a hexagonal crystal structure, but ideally of a R/3 m space group, is referred to as β"-alumina.

The term "beta-alumina" is used hereinafter, this being intended to encompass both β-alumina and β"-alumina, preferably the latter. In addition, the term "beta-alumina" used herein is intended to encompass any mixtures or phase mixtures of β-alumina and β"-alumina, preferably those in which the proportion of β"-alumina is greater than 90% by weight, more preferably greater than 95% by weight.

The geometry of the solid electrolytes, preferably of the beta-aluminas, may be highly varied, for example polygonal, flat bodies or solid rods having polygonal or round or oval cross-sectional geometry, or long hollow bodies of any cross-sectional geometry, for example rectangular, square, polygonal, oval, round, which may be open or closed at one end.

Solid electrolyte shaped bodies of good suitability are, for example, rods of any cross-sectional geometry, for example rectangular, square, polygonal, oval, round, the rods preferably having cylindrical geometry. Further preferred solid electrolyte shaped bodies are long hollow bodies of any cross-sectional geometry, for example rectangular, square, polygonal, oval, round, particular preference being given to cylindrical shaped bodies, i.e. tubes, which may be open at both ends or preferably closed at one end.

Very particularly preferred solid electrolytes, preferably beta-alumina solid electrolytes, are cylindrical tubes closed at one end.

One component of the inventive electrode unit is the porous solid state electrode. It is generally electrically conductive (electron conduction) and is within the space for the cathode material—described in detail above—directly adjacent to the solid electrolyte. Typically, the porous solid state electrode is in electrical contact with the typically molten cathode material described in detail above, and an external circuit, typically via a suitable current collector device.

Typically, the porous solid state electrode is also virtually resistant to the molten cathode material described in detail above. "Virtually resistant" in this context means that the material that forms the porous solid state electrode does not react chemically or electrochemically with the molten cathode material in a destructive or corrosive manner.

Materials of good suitability for the porous solid state electrode are, for example, amorphous carbon, graphite, glassy carbon (also referred to as "vitreous carbon"), preferably graphite felt, graphite foam (also referred to as "vitreous carbon foam"). Particular preference is given to graphite felt, which is known and is described, for example, in J. L. Sudworth, A. R. Tilley, "The Sodium Sulfur Battery", Chapman and Hall Ltd., 1985 (ISBN 0412 164906) in chapter 5.3.1 and 5.3.2, pages 159 to 164.

The material for the porous solid state electrode, preferably the graphite or graphite felt, may be partly or fully modified such that it is better wetted by the above-described molten polysulfides than by molten elemental sulfur. For example, the material for the porous solid state electrode, preferably the graphite or graphite felt, is partly or virtually fully impregnated for this purpose with sulfides or oxides of groups 1, 2 or 3 of the Periodic Table of the Elements, such as alumina ($Al_2O_3$), as described, for example, in U.S. Pat. No. 4,084,041.

The porous solid state electrode may fully or partly fill the space for the cathode material. Preferably, the porous solid state electrode partly fills the space for the cathode material and is directly adjacent to the solid electrolyte, spatially separated therefrom merely by the non-electron-conducting intermediate layer S, which is described in detail below, such that the following structure typically arises: solid electrolyte/intermediate layer S/porous solid state electrode, for example beta-alumina solid electrolyte/non-electron-conducting intermediate layer S/porous solid state electrode composed of graphite felt.

The porous solid state electrode, preferably the graphite or graphite felt, covers the surface of the solid electrolyte on the side facing the cathode material typically fully or else partly, for example to an extent of 50% to 100%, preferably to an extent of 90% to 100%, of the surface area, typically not including the base region of the solid electrolyte, for example the base of cylindrical tubes closed at one end, in the calculation.

The material—also called "starting material" herein which, according to the invention, absorbs the polysulfide compound to form the non-electron-conducting intermediate layer S is selected from alumina ($Al_2O_3$), silicon dioxide, for example glass fibers, mixed oxides of aluminum with silicon, silicates and aluminosilicates. These materials have virtually zero electrical conductivity under standard conditions, for example 25° C., 1 atm.

The starting material for the non-electron-conducting intermediate layer S and the non-electron-conducting intermediate layer S itself are typically porous having generally (i) an open porosity in the range from 50% to 99.99%, preferably 80% to 99%, more preferably 90% to 95%, the open porosity being calculated as follows: 1−(bulk density of the specimen/density of the material that forms the specimen)×100, and (ii) a mean pore diameter of typically in the range from 1 to 10 micrometers, measured by the method of optical microscopy.

Typically, the basis of the non-electron-conducting intermediate layer S is a flat structure—for example woven fabric, felt or mat—of fibers selected from the materials as described above, preferably selected from fibers of alumina, for example Saffil® from Saffil, and/or silicon dioxide, for example glass fibers.

According to the invention, the thickness of the non-electron-conducting intermediate layer S is in the range from 0.5 to 5 mm, preferably 1.0 to 3 mm, more preferably in the range from 1 to 2 mm.

The non-electron-conducting intermediate layer S is arranged between the porous solid state electrode and the solid electrolyte, and is virtually flush with the solid electrolyte surface.

The non-electron-conducting intermediate layer S typically covers virtually the entire area of the solid state electrode facing the solid electrolyte.

The non-electron-conducting intermediate layer S, before the first charge of the electrochemical device, has been completely impregnated with a polysulfide composition of the alkali metal that forms the alkali metal anode material, comprising (A) pure polysulfides $Met_2S_x$ with Met=alkali metal of the alkali metal anode material selected from lithium, sodium, potassium, especially sodium, and x is dependent on the alkali metal and is 2, 3, 4 or 5, preferably 3, 4 or 5, especially 4, for Na and is 2, 3, 4, 5, 6, 7, 8, preferably 3, 4, 5, 6, 7 or 8, for Li and is 2, 3, 4, 5, 6, preferably 3, 4 or 5, especially 5, for K, or (B) mixtures of the polysulfides of one and the same alkali metal from (A) with one another. This inventive polysulfide composition is preferably distributed homogeneously over the entire non-electron-conducting intermediate layer S.

In general, the non-electron-conducting intermediate layer S comprises the inventive polysulfide composition even after the first charge of the electrochemical device, for example during the operation or discharging or recharging thereof.

A process of good suitability for forming the intermediate layer S comprising the inventive polysulfide composition is the impregnation of the starting material for the non-electron-conducting intermediate layer S, as described above, for example alumina fibers and/or Saffil® fibers. Preferably, this impregnation is accomplished under virtually anhydrous and virtually oxygen-free or nonoxidizing conditions.

In a preferred embodiment for formation of the intermediate layer S comprising the inventive polysulfide composition, the procedure is as follows:

The starting material for the intermediate layer S, for example alumina fibers and/or Saffil® fibers, is applied, preferably in the form of a structure similar to a sheet of paper, to the surface of the solid electrolyte facing the cathode space, for example a cylindrical tube closed at one end described herein, for example by winding in the case of the cylindrical tube mentioned. The electrochemical device is assembled with the electrode unit and solid electrolyte thus prepared, and a reduced pressure is generated in the cathode space, for example by pumping off at least some of the gas present therein; the pressure in the cathode space is then, for example, 10 to 20 mbar (abs.). Then, typically in molten form, the inventive polysulfide composition of the alkali metal which is to form the anode material is transferred into the cathode space kept under reduced pressure, preferably from a reservoir vessel. In this case, the inventive polysulfide composition in the reservoir vessel is typically under a higher pressure at first than that in the cathode space. Preferred inventive polysulfide compositions are, for example, (i) pure polysulfides $Na_2S_x$ with x=2, 3, 4 or 5, preferably 3, 4 or 5, especially 4 or 5, or (ii) mixtures of the polysulfides from (i).

This procedure generally brings about full impregnation of the non-electron-conducting intermediate layer S and the porous solid state electrode, "full" being as defined above. After this conditioning, typically called "first filling", the inventive electrochemical device can be charged, typically by applying a current or electrical voltage.

An embodiment of good suitability for the inventive electrode unit and for the inventive electrochemical device that comprises it is described hereinafter.

The solid electrolyte herein is a cylindrical tube, closed at one end, of beta-alumina, for example having an internal diameter in the range from 20 to 60 mm and a length in the range from 0.05 to 2 m, for example a length in the range from 0.5 to 2 m, and a wall thickness in the range from 0.5 to 3 mm. Within this solid electrolyte, in this embodiment, is the molten alkali metal anode material sodium.

On the outside of this cylindrical solid electrolyte closed at one end, in this embodiment, is the non-electron-conducting intermediate layer S composed preferably of fibers of alumina, for example Saffil® from Saffil, or silicon dioxide, for example glass fibers, which, before the first charge, comprises preferably (i) pure polysulfides $Na_2S_x$ with x=2, 3, 4, or 5, preferably 3, 4 or 5, especially 4, or (ii) mixtures of the polysulfides from (i). The thickness of this non-electron-conducting intermediate layer S in this embodiment is typically in the range from 0.5 to 5 mm, preferably 1.0 to 3 mm, more preferably in the range from 1 to 2 mm. This intermediate layer S is adjoined, surrounding the outside of the cylindrical solid electrolyte closed at one end, by the porous solid state electrode as described above, the material of which has been described above, and is preferably graphite or graphite felt.

The porous solid state electrode is generally, and in this embodiment, connected to an external circuit via an electron conductor, for example a current collector or the metallic cell housing of the electrochemical device itself.

The porous solid state electrode is typically, and in this embodiment, surrounded by a device generally manufactured from metal, for example stainless steel, for example the metallic vessel wall of the cathode space.

The above-described embodiment of good suitability for the inventive electrode unit and for the inventive electrochemical device is shown by way of example in FIG. 1, the reference numerals having the following meanings:
  1 displacer body
  2 porous solid state electrode, for example composed of graphite felt
  3 solid electrolyte, for example composed of beta-alumina
  4 cathode space, for example comprising molten sodium polysulfide and sulfur
  5 anode space, for example comprising molten sodium metal
  6 current collector
  7 intermediate layer S, for example Saffil® impregnated with inventive polysulfide composition
  8 cell housing The present invention also provides a process for producing a non-electron-conducting intermediate layer S in an inventive electrode unit, wherein the porous starting material that forms the non-electron-conducting intermediate layer S is subjected to a pressure of less than 1 atm, for example 10 to 20 mbar (abs.) and impregnated with the molten inventive polysulfide composition.

In this context, a preferred starting material for the non-electron-conducting intermediate layer S is alumina fibers and/or Saffil® fibers, preferably in flat form, for example in the form of a woven fabric, felt or the like. Inventive polysulfide compositions preferred in this context are, for example, (i) pure polysulfides $Na_2S_x$ with x=2, 3, 4 or 5, preferably 3, 4 or 5, especially 4 or 5, or (ii) mixtures of the polysulfides from (i).

A process of this kind which is of good suitability for producing a non-electron-conducting intermediate layer S in an inventive electrode unit is conducted as follows:

The starting material for the non-electron-conducting intermediate layer S is applied to the surface of the solid electrolyte facing the cathode space. Then the solid state electrode is applied to the intermediate layer S. The electrochemical device is assembled with the electrode unit and solid electrolyte thus prepared, and a reduced pressure is generated in the cathode space, for example 10 to 20 mbar (abs.). Then, typically in molten form, the inventive polysulfide composition of the alkali metal which is to form the anode material is transferred into the cathode space kept under reduced pressure.

Preferred inventive polysulfide compositions are, for example, (i) pure polysulfides $Na_2S_x$ with x=2, 3, 4 or 5, preferably 3, 4 or 5, especially 4 or 5 or (ii) mixtures of the polysulfides from (i).

One embodiment of the process for producing a non-electron-conducting intermediate layer S in an inventive electrode unit is described below:

The starting material for the non-electron-conducting intermediate layer S, for example alumina fibers and/or Saffil® fibers, is applied, preferably in the form of a structure similar to a sheet of paper, to the surface of the solid electrolyte facing the cathode space, for example a cylindrical tube closed at one end as described herein, preferably made from beta-alumina, for example by winding in the case of the cylindrical tube mentioned. Then the solid state electrode, preferably composed of graphite felt, is applied to the intermediate layer S. The electrochemical device is assembled with the electrode unit and solid electrolyte thus prepared, and a reduced pressure is generated in the cathode space, for example by pumping off at least some of the gas present therein; the pressure in the cathode space is then, for example, 10 to 20 mbar (abs.). Then, typically in molten form, the inventive polysulfide composition of the alkali metal which is to form the anode material is transferred into the cathode space kept under reduced pressure, preferably from a reservoir vessel. In this case, this inventive polysulfide composition in the reservoir vessel is typically under a higher pressure at first than that in the cathode space. Preferred inventive polysulfide compositions here are, for example, (i) pure polysulfides $Na_2S_x$ with x=2, 3, 4 or 5, preferably 3, 4 or 5, especially 4 or 5, or (ii) mixtures of the polysulfides from (i).

This procedure generally brings about full impregnation of the intermediate layer S and the porous solid state electrode, "full" being as defined above. After this conditioning, typically called "first filling", the electrochemical device can be charged, typically by applying a current or electrical voltage.

The present invention also provides an electrochemical device comprising the inventive electrode unit. This electrochemical device may be a rechargeable battery for electrical energy, also called an "accumulator" or "secondary cell", or an electrolysis cell, for example for preparation of the alkali metals from the corresponding polysulfides $Met_2S_x$ as defined herein. The inventive electrochemical device is as described herein.

A preferred inventive electrochemical device is what is called the sodium-sulfur cell or else sodium-sulfur battery. It is described, for example, in Ullmann's Encyclopedia of Industrial Chemistry, vol. 4, D. Berndt, D. Spahrbier, chapter 7.2.2.2., pages 608 to 609 (2003).

One variant of the inventive sodium-sulfur cell is constructed as follows (variant 1) and is shown, for example, in FIG. 1, in which the reference numerals have the above-mentioned meanings.

The solid electrolyte is a cylindrical tube closed at one end, as described above, composed of a material as described above, preferably beta-alumina.

The anode space in variant 1 is the interior of the cylindrical solid electrolyte tube closed at one end, in which the molten alkali metal anode material sodium is present. A greater amount of the molten alkali metal anode material sodium is typically stored in a vessel which is connected to the anode space and is outside the actual electrochemical cell. In the discharged state of the electrochemical cell this reservoir vessel is generally virtually empty, and in the charged state of the electrochemical cell this reservoir vessel is generally virtually full. Typically arranged coaxially in the interior of the cylindrical tube closed at one end, alongside the molten sodium, is another solid or hollow cylindrical body having dimensions that are similar but smaller than those of the cylindrical solid electrolyte tube closed at one end ("displacer", reference numeral 1 in FIG. 1), such that an annular gap forms in which the molten alkali metal anode material sodium is present between the inner wall of the solid electrolyte and outer wall of the displacer. Typically, the displacer is manufactured from a metal, for example aluminum, steel, stainless steel, or other metals resistant to the alkali metals mentioned.

The cathode space in variant 1 begins at the outer surface of the cylindrical solid electrolyte tube closed at one end, and is bounded on the outside by a housing, for example of steel, stainless steel, chrome-plated aluminum or other preferably corrosion-resistant materials, as shown, for example, in FIG. 1 (reference numeral 8).

Applied to the outer surface of the cylindrical solid electrolyte tube closed at one end are, as described above, firstly the non-electron-conducting intermediate layer S and, on top of that, the porous solid state electrode, shown, for example, in FIG. 1 by reference numeral 2 (porous solid state electrode) and reference numeral 7 (non-electron-conducting intermediate layer S).

The molten cathode material in variant 1 is selected from (A) pure polysulfides $Na_2S_x$ with x=2, 3, 4, or 5, preferably 3, 4 or 5, especially 4, or (B) mixtures of the polysulfides from (A) with one another and/or in each case with elemental sulfur or (C) mixtures of $Na_2S$ with elemental sulfur and/or the polysulfides $Na_2S$, mentioned in (A) or (B).

Preferred molten cathode material in variant 1 is elemental sulfur, alone or in combination with one or more of the aforementioned polysulfides $Na_2S_x$.

Both molten cathode material and molten anode material are typically connected in an electrically conductive manner to a circuit.

Variant 1 is what is called a "central sodium cell", in which the sodium anode material is within the solid electrolyte and the molten cathode material described above under variant 1 surrounds the solid electrolyte.

A further variant of the inventive sodium-sulfur cell (variant 2) has virtually the same construction as variant 1, except that the cathode space together with the molten cathode material—the latter as described for variant 1—is the interior of the solid electrolyte, typically without a displacer. In variant 2, the anode space together with the molten sodium surrounds the solid electrolyte and is bounded by a metallic housing. Variant 2 is what is called a "central sulfur cell".

Preference is given in the context of the invention to variant 1, i.e. the central sodium cell.

The inventive electrochemical device is operated typically at a temperature in the range from 300 to 400° C.

The inventive electrochemical device, preferably that of variant 1, is typically an accumulator, but it can also be used as an electrolysis cell.

If the inventive electrochemical device is used as an electrolysis cell, an alkali metal sulfide $Met_2S$ and/or alkali metal polysulfide $Met_2S_x$ is typically initially charged in the cathode space, optionally in combination with elemental sulfur, each as described and defined herein. The solid electrolyte has ion conductivity for the corresponding alkali metal ion and the anode space is connected to the cathode space in an electrically conductive manner via a circuit.

A voltage source integrated in the circuit typically sends electrical current through the inventive electrochemical device and, in the cathode space, cleaves the alkali metal sulfide $Met_2S$ and/or alkali metal polysulfide $Met_2S_x$—$Met_2S$ and $Met_2S_x$ being as defined and described herein—preferably with Met=lithium, sodium, potassium as alkali metals, to the corresponding elemental alkali metals, with deposition of sulfur in the anode space.

The present invention also provides a process for first charging of an electrochemical device as defined herein, which comprises initially charging the space for the molten cathode material with a polysulfide compound (I) as a melt, comprising: (A) pure polysulfides $Met_2S_x$ with Met=alkali metal of the desired alkali metal anode material, selected from lithium, sodium, potassium, especially sodium, and x is dependent on the alkali metal and is 2, 3, 4 or 5, preferably 3, 4 or 5, especially 4, for Na and is 2, 3, 4, 5, 6, 7, 8, preferably 3, 4, 5, 6, 7, or 8, for Li and is 2, 3, 4, 5, 6, preferably 3, 4 or 5, especially 5, for K, or (B) mixtures of the polysulfides of one and the same alkali metal from (A) with one another and/or in each case with elemental sulfur or (C) mixtures of the particular alkali metal sulfide $Met_2S$ with elemental sulfur and/or the polysulfides $Met_2S_x$ mentioned in (A) or (B), and additionally installing, in the space for the molten anode material, an electron-conducting device in such a way that it touches the surface of the solid electrolyte facing the anode material at least in the lower region, connects cathode space and anode space to an electrical circuit and sends an electrical current through this electrochemical device, such that the polysulfide compound (I) is cleaved electrolytically, forming elemental sulfur in the cathode space and metallic alkali metal in the anode space.

Installed in the space which accommodates the molten alkali metal anode material, as described herein, in the case of operation of the inventive electrochemical device as an accumulator is an electron-conducting device, in such a way that it touches the surface of the solid electrolyte facing the anode material, at least in the lower region, and establishes an electrical contact. This device may, for example, be the above-described displacer which has electrically conductive, typically metallic, spring elements, for example made from stainless steel or aluminum, mounted at least on part of the surface thereof, these being in contact with the inner surface of the solid electrolyte.

The solid electrolyte has ion conductivity for the corresponding alkali metal ion of the polysulfide compound (I).

The anode space is connected to the cathode space in an electrically conductive manner via a circuit, such that a voltage source integrated in the circuit sends an electrical current through the inventive electrochemical device, such that the polysulfide compound (I) is electrolytically cleaved, forming elemental sulfur in the cathode space and metallic alkali metal, preferably sodium, in the anode space. As a result, the electrochemical cell is typically charged.

The first charge and the later operation of the inventive electrochemical device are typically conducted at a temperature in the range from 300 to 400° C.

The inventive electrochemical device charged for the first time in this way can then function as an accumulator and release electrical energy to a consumer. Once it has been discharged, it can be recharged again and again as described above.

A preferred electrochemical device for the process for first charging is the above-described inventive sodium-sulfur cell as variant 1, shown, for example, in FIG. 1. This preferred process for first charging of an electrochemical device is conducted as described above, with the following differences:

The solid electrolyte is a cylindrical tube closed at one end, as described above, composed of beta-alumina.

The anode space is the interior of the cylindrical tube closed at one end, in which the molten alkali metal anode material sodium is produced in the course of cell charging.

The electron-conducting device is arranged coaxially within the cylindrical tube closed at one end, in the form of a solid or hollow cylindrical body having dimensions that are similar but smaller than those of the cylindrical tube closed at one end ("displacer", reference numeral 1 in FIG. 1) such that an annular gap forms between the inner wall of the solid electrolyte and the outer wall of the displacer, and the displacer touches the inner surface of the solid electrolyte, at least in the lower region, at at least one point, for example via spring elements, such that an electrical contact forms. The displacer is typically manufactured from a metal, for example aluminum, steel, stainless steel or other metals resistant to the alkali metals mentioned.

The cathode space in variant 1 begins at the outer surface of the cylindrical tube closed at one end and is bounded on the outside by a housing, for example of steel, stainless steel, chrome-plated aluminum or other, preferably corrosion-resistant, materials, as shown, for example, in FIG. 1 (reference numeral 8).

Applied to the outer surface of the cylindrical tube of the solid electrolyte which is closed at one end are, as described above, firstly the non-electron-conducting intermediate layer S and, on top of that, the porous solid state electrode, shown, for example, in FIG. 1 by reference numeral 2 (porous solid state electrode) and reference numeral 7 (non-electron-conducting intermediate layer S).

The molten cathode material is selected from (A) pure polysulfides $Na_2S_x$ with x=2, 3, 4, or 5, preferably 3, 4 or 5, especially 4, or (B) mixtures of the polysulfides from (A) with one another and/or in each case with elemental sulfur or (C) mixtures of $Na_2S$ with elemental sulfur and/or the polysulfides $Na_2S_x$ mentioned in (A) or (B). Preferred molten cathode material is the aforementioned components (A) or (B).

Both molten cathode material and molten anode material are connected to a circuit in an electrically conductive manner.

The present application also provides for the use of a non-electron-conducting intermediate layer S in an electrode unit for an electrochemical device, comprising (i) a solid electrolyte which divides a space for molten cathode material and a space for molten alkali metal anode material, and (ii) a porous solid state electrode which is separated from the solid electrolyte by a non-electron-conducting intermediate layer S, wherein the intermediate layer S has a thickness in the range from 0.5 to 5 mm and, before the first charge of the electrochemical device, has been impregnated fully with a polysulfide composition of the alkali metal that forms the alkali metal anode material, comprising (A) pure polysulfides $Met_2S_x$ with Met=alkali metal of the alkali metal anode material selected from lithium, sodium, potassium, especially sodium, and x is dependent on the alkali metal and is 2, 3, 4 or 5, preferably 3, 4 or 5, especially 4, for Na and is 2, 3, 4, 5, 6, 7, 8, preferably 3, 4, 5, 6, 7, or 8, for Li and is 2, 3, 4, 5, 6, preferably 3, 4 or 5, especially 5, for K, or (B) mixtures of the polysulfides of one and the same alkali metal from (A) with one another.

The advantage of the present invention is that the inventive electrochemical device, in the event of a fracture of or damage to the solid electrolyte, prevents or reduces direct contact, especially in the charged state of the battery, of liquid sodium with liquid sulfur, for example at high temperature such as 300 to 400° C., and, especially directly at the site of fracture of or damage to the solid electrolyte, the occurrence of a strong exothermic reaction which would lead, for example, to abrupt vaporization of the sulfur with rapid pressure buildup in the cell, which would damage or destroy it, and would release the contents thereof, which could react vigorously with the surrounding atmosphere and hence would ultimately damage or destroy other cells or even the entire battery, while the internal resistance of the intact inventive electrochemical device remains low in spite of a non-electron-conducting intermediate layer S.

EXAMPLES

Example 1: For Comparison

Deliberate Destruction of a Sodium-Sulfur Cell—Without Intermediate Layer S—in the Charged State A standard sodium-sulfur cell ("central sodium cell") was constructed from a cylindrical solid electrolyte composed of beta"-alumina, closed at the bottom and having an internal diameter of 5.6 cm, a wall thickness of 0.2 cm and a length of 50 cm, in which was disposed, in an axially central position, a solid cylindrical displacer body made of 1.4404 stainless steel (diameter 5.5 cm, length 45.5 cm), which formed an annular gap between the outer surface of the displacer body and the inner surface of the solid electrolyte, the annular gap being the anode space. Directly on the outer surface of the solid electrolyte were a 5 mm-thick layer of graphite felt electrode and a device for making electrical contact with this electrode, i.e. a current collector. This electrode unit/solid electrolyte was accommodated in a virtually axially central position in a cylindrical metal housing made of stainless steel having an internal diameter of 10.8 cm and the space between the outer surface of the solid electrolyte and the metal housing was the cathode space.

The cell was heated to 300° C. The cathode space was evacuated with the aid of a vacuum pump and then filled with about 5 kg of molten liquid sulfur. The anode space was not under reduced pressure and was charged with 45 g of molten sodium from an external reservoir vessel via an overflow system. Measurement points for temperature and pressure were arranged at different points in the cathode space. At the base of the metal housing was mounted a T-shaped line with a bursting disk that bursts at 10 bar gauge in the vertical leg thereof. The horizontal leg of the line, which can be shut off, was utilized for filling of the cathode space with sulfur.

A hydraulic pump was used to pump high-boiling oil, which is virtually inert with respect to sodium under the conditions, into the anode space that had been filled virtually completely with liquid sodium, and hence pressure was exerted on the inner surface of the solid electrolyte too, At a pressure of about 80 bar, the solid electrolyte was destroyed by fracture. When the solid electrolyte fractured, sodium and sulfur came into direct contact and reacted vigorously to form heat and pressure.

The temperature in the upper part of the cell rose to more than 1200° C. within the first second after the fracture of the solid electrolyte. The abrupt temperature jumps at some points in the cell led to vaporization within milliseconds of such a large amount of sulfur that local pressures of 10 bar occurred. As a result, the total pressure within the cell reached at least 11 bar during the first second, a pressure at which the bursting disk burst.

Example 2: Inventive

Deliberate destruction of a sodium-sulfur cell—with intermediate layer S—in the charged state The experimental setup was analogous to example 1, except that a 1 mm-thick layer of matted polycrystalline alumina fibers, commercially available as Saffil® Paper from Saffil, was on the outer surface of the solid electrolyte. This layer was joined directly by a 5 mm-thick layer of graphite felt electrode, which was provided with a device for making electrical contact with this electrode.

The cell was heated to 300° C. The cathode space was brought to a pressure of about 20 mbar (abs.) with the aid of a vacuum pump and then charged with about 5 kg of molten liquid $Na_2S_5$ (disodium pentasulfide), and hence the intermediate layer S and the porous solid state electrode were impregnated with $Na_2S_5$. In the nitrogen-filled anode space, there was no sodium at first (at the start of the experiment); it was then filled with sodium by sending an electrical current through the cell and electrochemically decomposing the disodium pentasulfide. In this way, the cell was charged.

Measurement points for temperature and pressure were arranged at different points in the cathode space.

The cell was charged up to 80%, i.e. 80% of the disodium pentasulfide ($Na_2S_5$) introduced at the start were converted electrochemically to elemental sodium and elemental sulfur.

The solid electrolyte was then destroyed by means of a hydraulic pressure of 80 bar, as described above in example 1, and a less vigorous reaction was observed.

The temperature rise within the cell proceeded gradually over a few minutes and only rose to about 470° C. at a few points. The pressure within the cell rose only by 0.6 bar (abs.) within one minute, and the bursting disk remained intact. The pressure buildup within the cell was still within the range of normal operating pressure of a sodium-sulfur cell.

This experiment showed that the intermediate layer S prevents an uncontrolled and explosive reaction in the destruction of a solid electrolyte of a sodium-sulfur cell, and hence increases the safety of such a cell.

The invention claimed is:

1. An electrode unit for an electrochemical device, comprising (i) a solid electrolyte which divides a space for molten cathode material, selected from the group consisting of elemental sulfur and polysulfide of the alkali metal anode material, and a space for molten alkali metal anode material and (ii) a porous solid state electrode adjacent to the solid electrolyte within the space for the cathode material, with a non-electron-conducting intermediate layer S present between the solid state electrode and the solid electrolyte, wherein this intermediate layer S has a thickness in the range from 1.0 to 5 mm and, before the first charge of the electrochemical device, has been impregnated fully with a polysulfide composition, comprising (A) pure polysulfides $Met_2S_x$ with Met=alkali metal of the alkali metal anode material selected from lithium, sodium, potassium, and x is dependent on the alkali metal and is 2, 3, 4 or 5 for Na and is 2, 3, 4, 5, 6, 7, 8 for Li and is 2, 3, 4, 5, 6 for K, or (B) mixtures of the polysulfides of one and the same alkali metal from (A) with one another; wherein the solid electrolyte is a polycrystalline ceramic material having an ion conductivity for the alkali metal ions that correspond to the alkali metal anode material; wherein only the intermediate layer S is between the porous solid state electrode and the solid electrolyte.

2. The electrode unit according to claim 1, wherein the basis of the non-electron-conducting intermediate layer S is a flat structure of fibers selected from alumina ($Al_2O_3$), silicon dioxide, mixed oxides of aluminum with silicon, silicates and aluminosilicates.

3. The electrode unit according to claim 1, wherein the solid electrolyte is a cylindrical shaped body closed at one end.

4. An electrochemical device comprising the electrode unit as defined in claim 1.

5. The electrochemical device according to claim 4, wherein the electrochemical device is a sodium-sulfur cell.

6. A process for first charging of the electrochemical device as defined in claim 4, which comprises initially charging the space for the molten cathode material with a polysulfide compound (I) as a melt, comprising: (A) pure polysulfides Met2Sx with Met=alkali metal of the desired alkali metal anode material, selected from lithium, sodium, potassium, x is dependent on the alkali metal and is 2, 3, 4 or 5 for Na and is 2, 3, 4, 5, 6, 7, 8 for Li and is 2, 3, 4, 5, 6 for K, or (B) mixtures of the polysulfides of one and the same alkali metal from (A) with one another and/or in each case with elemental sulfur or (C) mixtures of the particular alkali metal sulfide Met2S with elemental sulfur and/or the polysulfides Met2Sx mentioned in (A) or (B), and additionally installing, in the space for the molten anode material, an electron-conducting device in such a way that it touches the surface of the solid electrolyte facing the anode material at least in the lower region, connects cathode space and anode space to an electrical circuit and sends an electrical current through this electrochemical device, such that the polysulfide compound (I) is cleaved electrolytically, forming elemental sulfur in the cathode space and metallic alkali metal in the anode space.

7. A process for producing a non-electron-conducting intermediate layer S in the electrode unit as defined in claim 1, which comprises subjecting a porous starting material that forms the non-electron-conducting intermediate layer S to a pressure of less than 1 atm and impregnating it with a molten polysulfide composition of the alkali metal that forms the alkali metal anode material comprising (A) pure polysulfides Met2Sx with Met=alkali metal of the alkali metal anode material selected from lithium, sodium, potassium, and x is dependent on the alkali metal and is 2, 3, 4 or 5 for Na and is 2, 3, 4, 5, 6, 7, 8 for Li and is 2, 3, 4, 5, 6 for K, or (B) mixtures of the polysulfides of one and the same alkali metal from (A) with one another.

* * * * *